United States Patent
Smith et al.

(10) Patent No.: US 12,128,542 B2
(45) Date of Patent: Oct. 29, 2024

(54) PORTABLE TRAY AND INSTALLATION METHOD

(71) Applicant: The Boeing Company, Arlington, VA (US)

(72) Inventors: Peter Ray Smith, Suffolk, VA (US); Karl James Ettling, Ridgecrest, CA (US); Kenneth Alan Szarek, Beaufort, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/172,106

(22) Filed: Feb. 21, 2023

(65) Prior Publication Data

US 2024/0278417 A1 Aug. 22, 2024

(51) Int. Cl.
*B25H 3/06* (2006.01)
*B60N 3/00* (2006.01)

(52) U.S. Cl.
CPC ............ *B25H 3/06* (2013.01); *B60N 3/007* (2013.01); *Y10S 211/01* (2013.01)

(58) Field of Classification Search
CPC .......... B25H 3/06; B25H 3/04; Y10S 211/01; A47B 31/06; A47B 31/04; A47B 96/027; B60N 3/004; B60N 3/005; B60N 3/007; B60N 3/002; B60N 3/001
USPC ...... 211/70.6, 88.01, DIG. 1; 108/47, 44, 49
See application file for complete search history.

(56) References Cited

U.S. PATENT DOCUMENTS

| | | | | |
|---|---|---|---|---|
| 1,282,489 A | * | 10/1918 | Strodel | A47B 19/06 248/447.2 |
| 1,958,266 A | * | 5/1934 | De Foe | B60N 3/007 108/46 |
| 2,201,598 A | * | 5/1940 | Towler | D06F 81/003 108/135 |
| 2,267,861 A | * | 12/1941 | Haley | A47C 7/70 108/45 |
| 2,593,222 A | * | 4/1952 | Franklin | B60N 3/007 248/231.71 |
| 2,645,537 A | * | 7/1953 | Brath | B60N 3/007 108/46 |
| 2,680,523 A | * | 6/1954 | Heeter | B60N 3/004 224/564 |
| 2,687,336 A | * | 8/1954 | Smith | B60N 3/004 108/34 |

(Continued)

FOREIGN PATENT DOCUMENTS

DE 1927599 U 11/1965
DE 202016105542 U1 12/2016

(Continued)

OTHER PUBLICATIONS

Extended European Search Report, dated Jul. 19, 2024, regarding EP Application No. 24158540.5, 9 pages.

*Primary Examiner* — Jennifer E. Novosad
(74) *Attorney, Agent, or Firm* — Yee & Associates, P.C.

(57) ABSTRACT

A tray used to support maintenance tools and service materials along an open bay in the side of a vehicle. The tray prevents these items from being damaged, or becoming foreign objects or debris that enter the open bay. The tray includes hanger assemblies that releasably attach the tray to bay door latches. Adjustable length standoffs connect the tray to the side of the vehicle to support and prevent swaying of the tray.

23 Claims, 14 Drawing Sheets

(56) References Cited

U.S. PATENT DOCUMENTS

| | | | | |
|---|---|---|---|---|
| 2,784,041 | A * | 3/1957 | La Hood | B60N 3/007 108/11 |
| 2,844,429 | A * | 7/1958 | Frey | A47B 23/002 108/115 |
| 2,865,432 | A * | 12/1958 | Dearing | A47C 7/705 108/47 |
| 2,932,544 | A * | 4/1960 | Lambert | B60N 3/004 211/119.007 |
| 3,164,109 | A * | 1/1965 | Atkinson | B60N 3/007 108/134 |
| 3,194,186 | A * | 7/1965 | Brown | B60N 3/007 108/46 |
| 3,266,443 | A * | 8/1966 | Lee | B60N 3/007 108/46 |
| 3,289,615 | A * | 12/1966 | Marschak | A47F 5/0068 108/97 |
| 4,811,875 | A * | 3/1989 | DiSimone | B25H 5/00 108/158 |
| 5,005,491 | A * | 4/1991 | Waterman | B60N 3/007 108/46 |
| 5,302,014 | A * | 4/1994 | Hobson | B25H 3/00 312/249.12 |
| 5,331,904 | A * | 7/1994 | DiSimone | B25H 1/18 108/26 |
| 5,386,915 | A * | 2/1995 | Sirhan | B25H 3/04 211/13.1 |
| 5,443,019 | A * | 8/1995 | Sheldrick | B25H 5/00 108/44 |
| 5,590,607 | A * | 1/1997 | Howard | A47B 21/0314 248/231.71 |
| 5,598,786 | A * | 2/1997 | Patterson | A47B 23/001 108/43 |
| 5,722,329 | A * | 3/1998 | Weng | A47B 5/00 108/47 |
| 5,755,411 | A * | 5/1998 | Strong, III | B60N 3/007 248/118 |
| 5,803,422 | A * | 9/1998 | Buehler | A47B 96/02 248/339 |
| 6,006,906 | A | 12/1999 | Winnard | |
| 6,189,847 | B1 | 2/2001 | Hart | |
| 6,293,206 | B1 * | 9/2001 | Simon | B60N 3/002 108/46 |
| 6,679,549 | B2 * | 1/2004 | Catelli | A47D 1/106 297/174 CS |
| 6,729,439 | B1 * | 5/2004 | Zlatis | B25H 3/04 248/210 |
| 7,354,023 | B1 * | 4/2008 | Wappler | B25H 5/00 248/339 |
| 8,511,240 | B1 * | 8/2013 | Strock | A47B 96/065 248/231.71 |
| 8,857,347 | B1 * | 10/2014 | Liu | A47B 5/02 108/47 |
| 8,985,033 | B1 * | 3/2015 | Whitlock | F16M 13/022 108/152 |
| 8,985,335 | B1 * | 3/2015 | Fisher | B25H 3/06 206/557 |
| 9,089,203 | B1 * | 7/2015 | Al-Raqadi | B43K 23/001 |
| 10,786,073 | B1 * | 9/2020 | Dillard | F16B 5/004 |
| 11,147,396 | B2 * | 10/2021 | McMillan | A47F 5/0018 |
| 11,724,631 | B1 | 8/2023 | Arnall | A47J 36/34 108/44 |
| 2016/0157603 | A1 * | 6/2016 | Graham | B60N 3/001 108/44 |
| 2018/0319006 | A1 | 11/2018 | Jenkins | |
| 2024/0057768 | A1 * | 2/2024 | Allen | A47B 97/001 |

FOREIGN PATENT DOCUMENTS

| | | |
|---|---|---|
| GB | 2583693 A | 11/2020 |
| WO | 2004014198 A2 | 2/2004 |

* cited by examiner

PORTABLE TRAY AND INSTALLATION METHOD

BACKGROUND INFORMATION

1. Field

The present disclosure broadly relates to work surfaces to support tools and other objects, deals more particularly with a tray that can be removably mounted a structure, such as on an open bay in the side of a vehicle.

2. Background

It is often desirable to provide work surfaces such as benches, carts or trays close to work that is to be performed. Some environments make it difficult to position the work surface close to a work area. For example, maintenance or inspection of systems in a vehicle, such as for example an aircraft, may require that service technicians access the systems through outer bays in the side of the aircraft. Servicing these systems often requires ready access to tools, laptop computers, instruction sets and parts, among other things which can lead to foreign object debris hereinafter "FOD". Because of the elevated position of aircraft bays, it can be difficult to position a work bench or cart within a technician's reach. Consequently, the technician may temporarily place tools and parts inside the bay while completing the service/inspection. As a result, tools or parts may be inadvertently left inside the bay, or lost, resulting in FOD.

Accordingly, it would be desirable solve the problem mentioned above by providing a work surface tray that can be removably mounted along an open bay where FOD may be placed. It would also be desirable to provide a method of installing such a tray along an open bay on an aircraft.

SUMMARY

This disclosure relates in general to work surfaces, and more specifically to a tray that can serve as a work surface and be removably mounted along the edge of a structure, such as an open bay on the side of a vehicle. The tray includes a shelf supported on the structure by hanger assemblies that allow the tray to be quickly mounted, and later removed from the structure.

According to one aspect, a tray is provided that is configured to be removably mounted on the side of the structure. The tray comprises a shelf, and a pair of hanger assemblies spaced apart from each other and configured to hang the shelf on the structure. Each of the hanger assemblies includes an upper arm removably attached to the structure and a lower arm configured to support the shelf.

According to still another aspect, a tray is provided that is configured to be mounted along an open bay in the side of a vehicle, such as an aircraft. The tray comprises a shelf, and a pair of hanger assemblies. The hanger assemblies are configured to hang the shelf on the side of the vehicle beneath the open bay. Each of the hanger assemblies includes an upper arm configured to be attached to the vehicle along an edge of the open bay.

According to a further aspect, a method is provided of installing a tray along an open bay in the side of a vehicle. The method includes positioning a tray along the open bay, and mounting the tray on an edge of the open bay.

The disclosed tray solves the problem of positioning a work surface within ready reach of a technician servicing systems located in an open bay in the side of a vehicle such as for example an aircraft. Provision of a tray located immediately adjacent to, but outside of the open bay reduces or eliminates the possibility of FOB being placed inside the open bay by the technician. The disclosed tray may also eliminate the need for portable carts or ground based work surfaces to support FOD beneath an open aircraft bay, and may reduce the amount of bending and movement required by a technician to retrieve tools from the ground.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
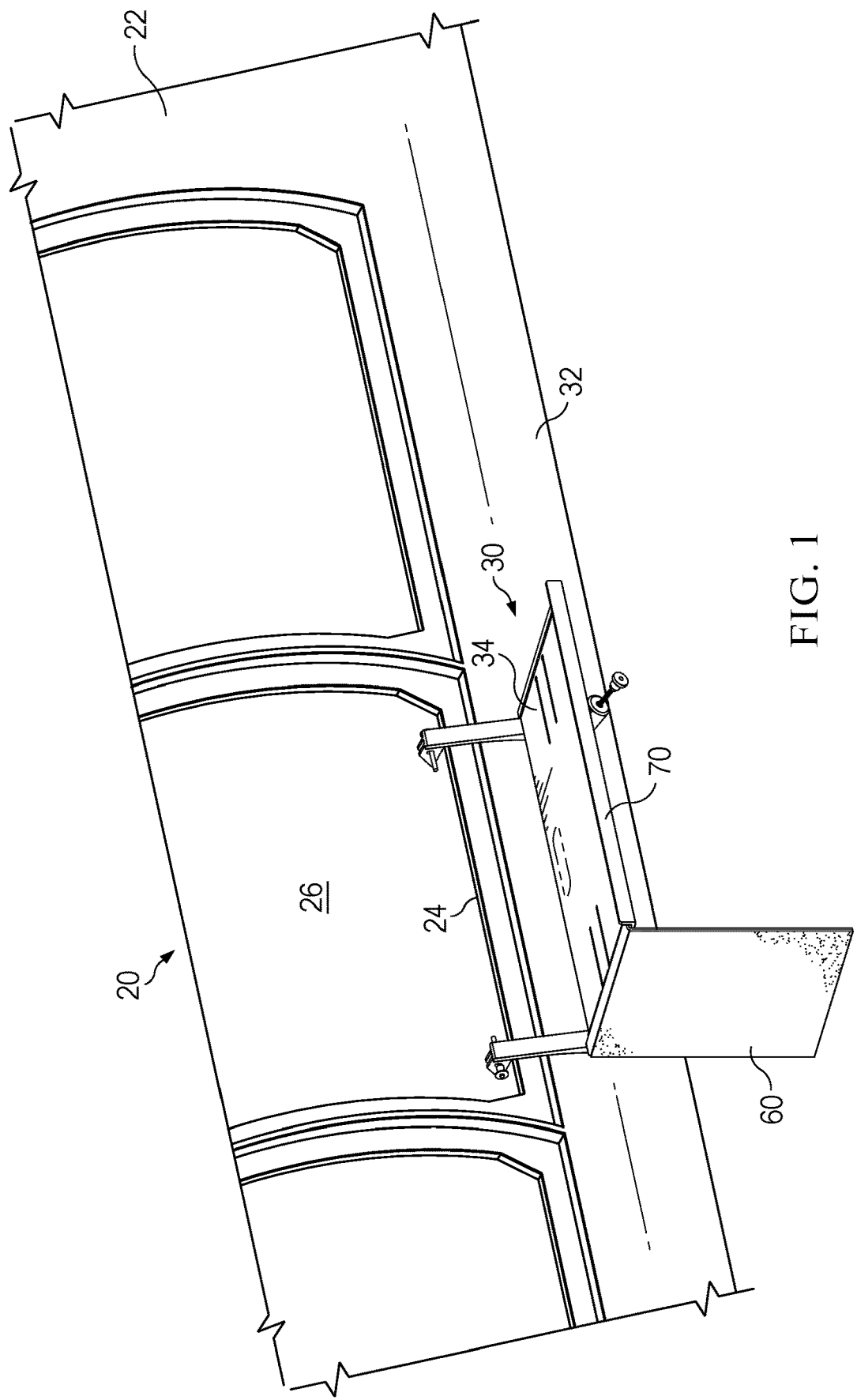
FIG. 1 is a perspective view of an example tray mounted along an edge of an open bay in a vehicle.
Figure 2:
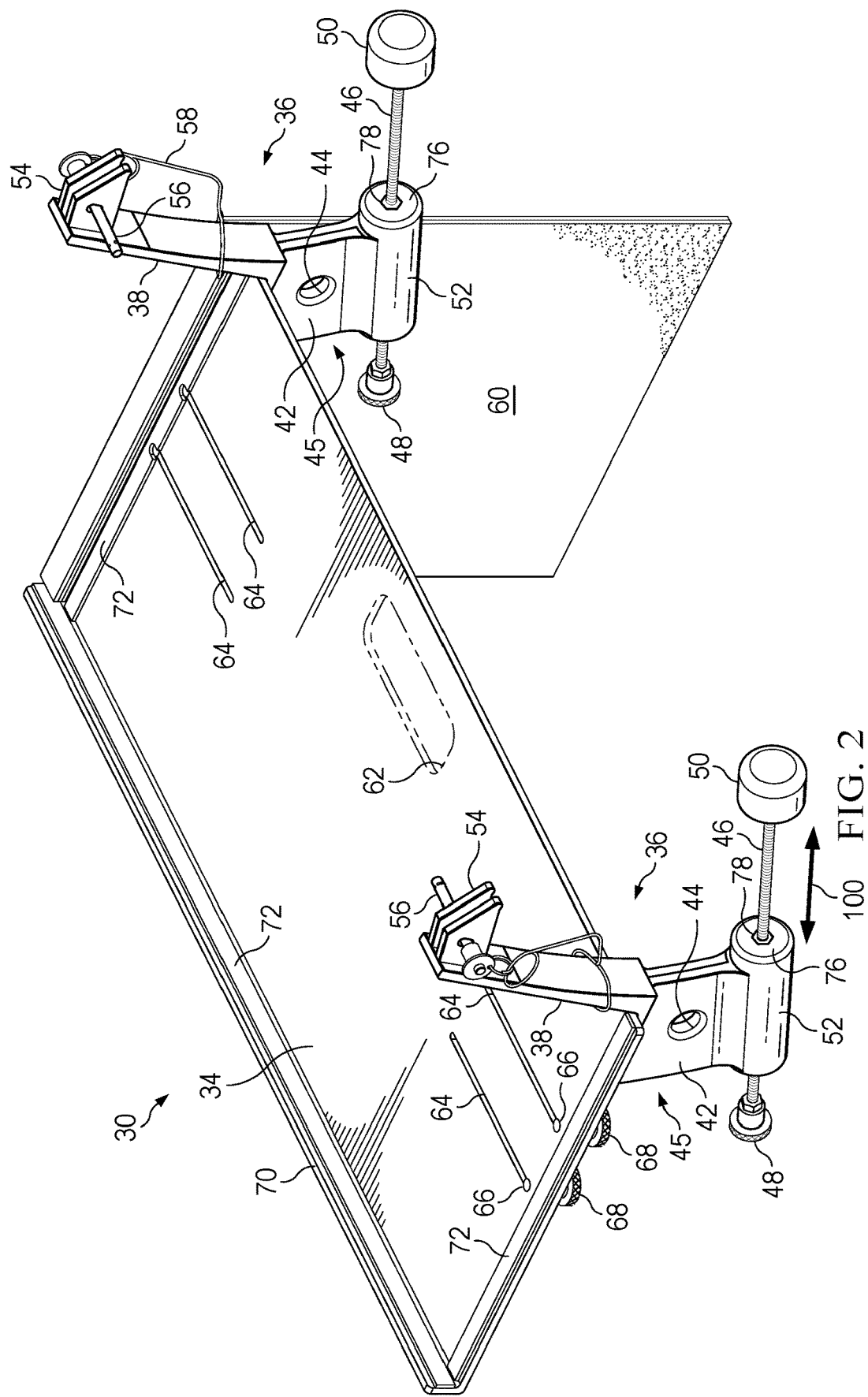
FIG. 2 is a top, rear perspective view of the example tray shown in FIG. 1, an optional handhold opening being shown in broken lines.
Figure 14:
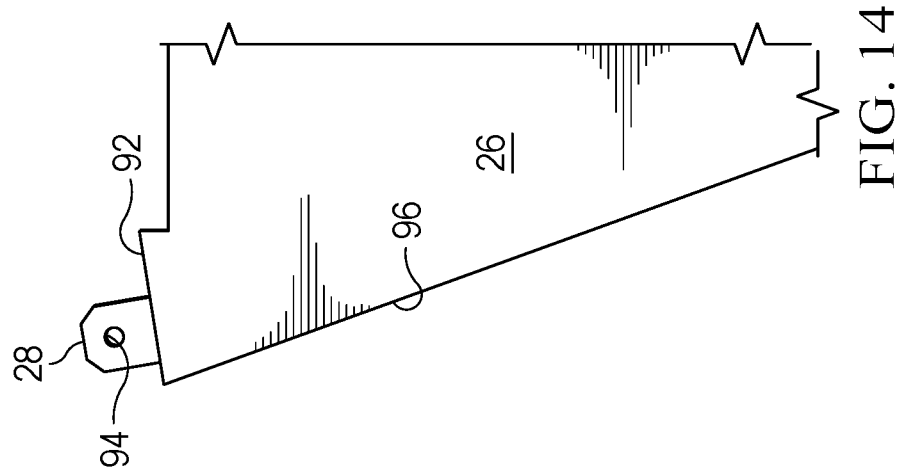
FIG. 14 is a fragmentary side view of a portion of a vehicle bay showing a bay door latch.

Referring first to FIG. 1, a structure such as a vehicle 20 (e.g. an aircraft, spacecraft, rotorcraft, unmanned aerial vehicle, wheeled or tracked vehicle, marine or submarine vehicle, and the like) typically may have one or more bays 26 in a side of a fuselage 22 that are normally covered by bay doors (not shown). The bays 26 contain various systems or components that require periodic service and/or inspection by a technician. In order to aid the technician in performing the service/inspection, a tray 30 is removably attached to the aircraft 20, along a bottom edge 24 of an open bay 26, between two lug-like bay door latches 28 (FIG. 14). The bay latches 28 secure the bay door against the fuselage 22 of the aircraft 20 in a closed, locked position. The tray 30 includes a shelf 34 on which items such as tools, work instructions, new/replacement parts, laptop computers, etc., can be temporarily placed for ready access within arms' reach of the technician, thereby eliminating the need for placing these parts inside the open bay 26 and reducing the potential for these items to become FOD within the open bay 26. As will be discussed later in more detail, the tray 30 is removably mounted along and supported on a sill or edge 24 of the open bay 26, allowing the technician ready access to any items placed on the shelf 34. As later described, the tray 30 includes numerous features that allow a technician to perform various services without bending or stepping away from the open bay 26.

Referring also to FIGS. 2-10, the tray 30 broadly includes a substantially flat shelf 34, and a pair of spaced apart hanger assemblies 36 that removably mount the tray 30 on the side of the aircraft 20 along the edge 24 of the open bay 26. The shelf 34 may be formed of any suitable, rigid material such as a metal, e.g. aluminum, plastic, or a reinforced composite material. While the exemplary shelf is rectangular in shape, other shelf shapes are possible without departing from the present solution.

The shelf 34 includes an outer, up-standing lip 70 which assists in preventing FOD from falling off the front edge of the shelf 34. Optionally, magnetic strips 72 are adhesively attached to the shelf 34 along its sides and outer edges which function to prevent metallic FOD from sliding off the outer edges of the shelf 34. As discussed below in more detail, the shelf 34 includes two pairs of parallel, spaced apart slots 64 therein which allow the hanger assemblies 36 to be slid toward or away from each other to any of a plurality of adjustment positions best suited to support the tray 30 on the aircraft 20. Optionally, the shelf 34 may include one or more openings 62 therein that function as handholds which allow the tray 30 to be gripped and transported by a technician.

Figure 3:
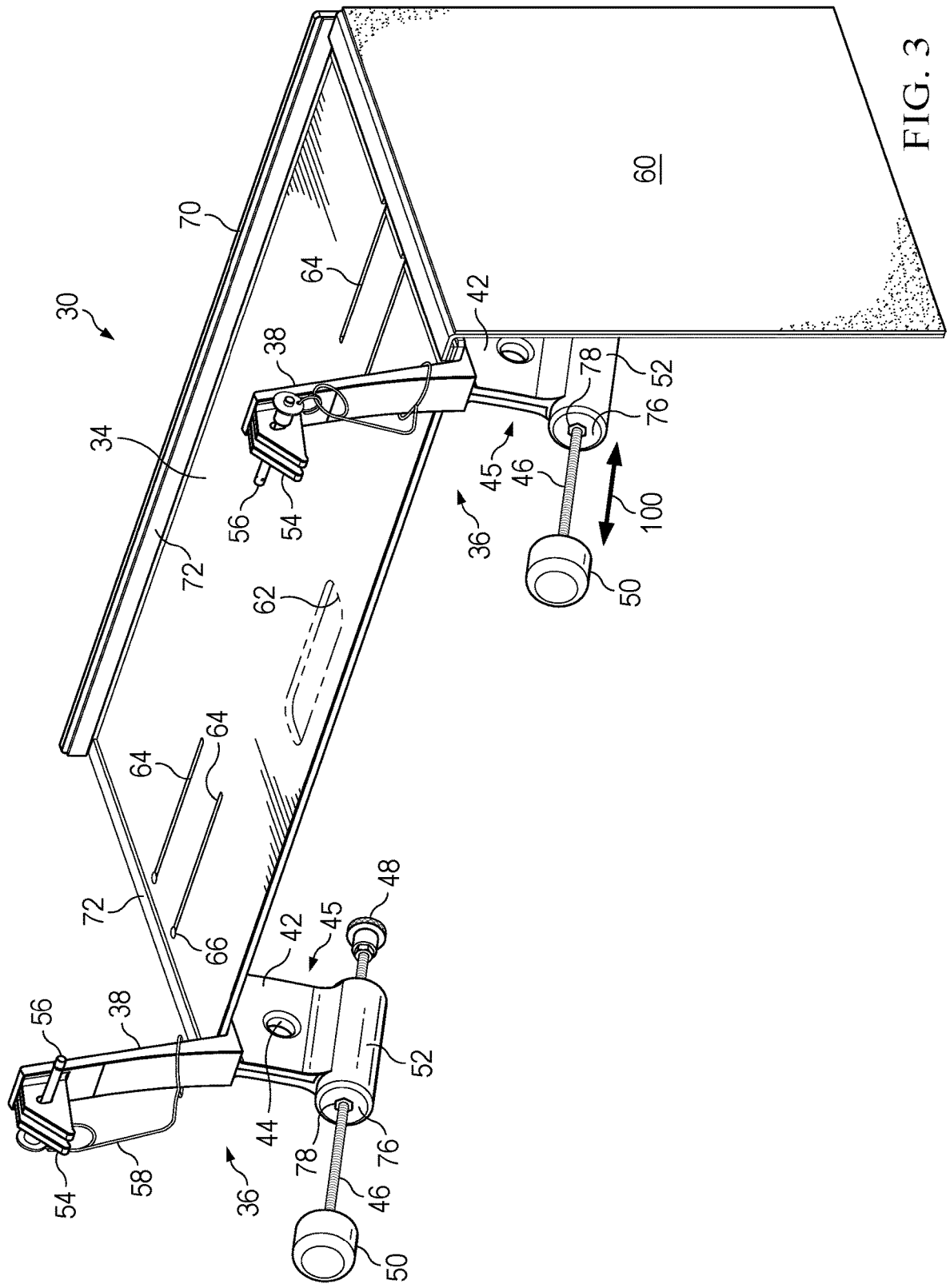
FIG. 3 is a top, rear perspective view of the example tray taken from another angle.
Figure 4:
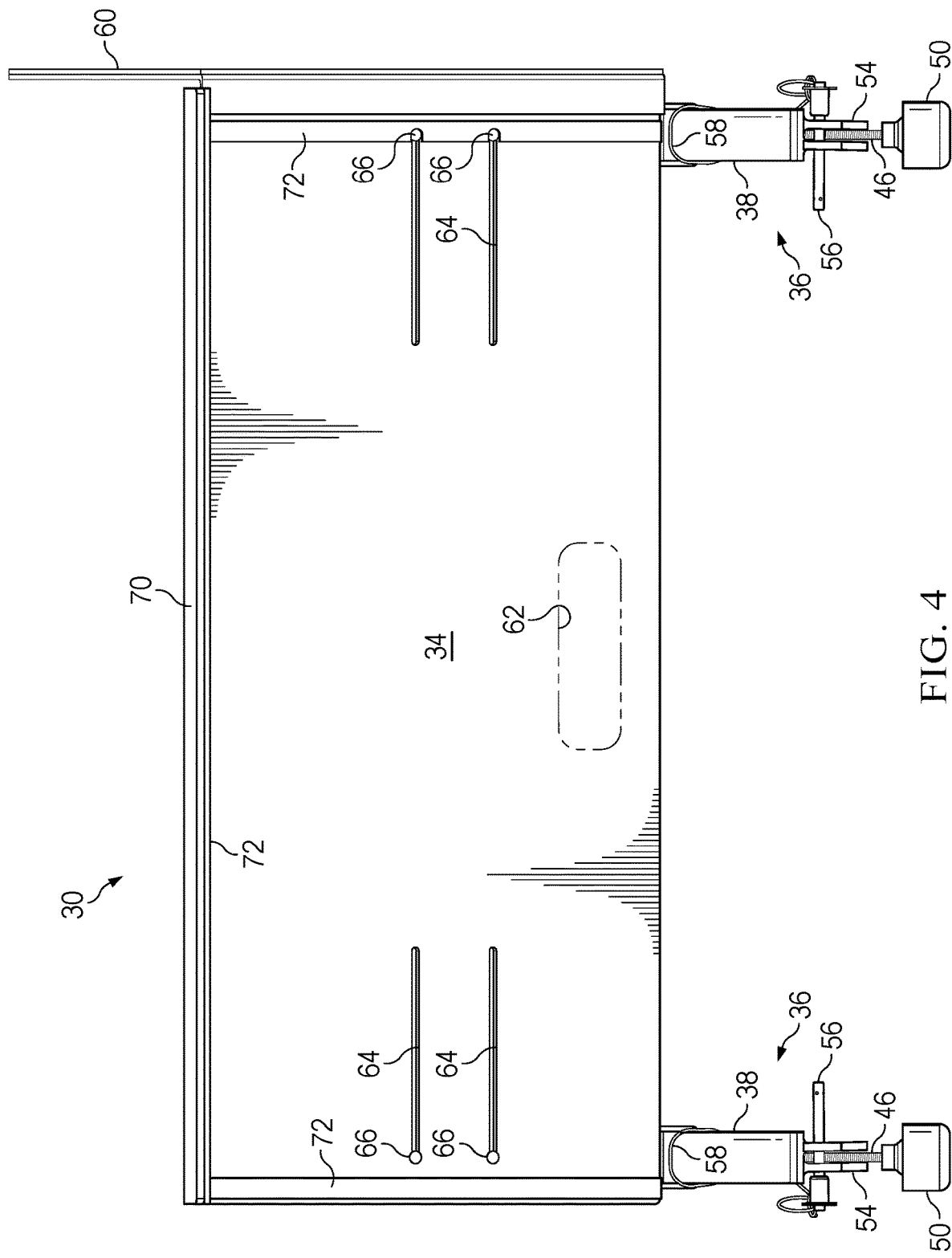
FIG. 4 is a top plan view of the example tray.
Figure 5:
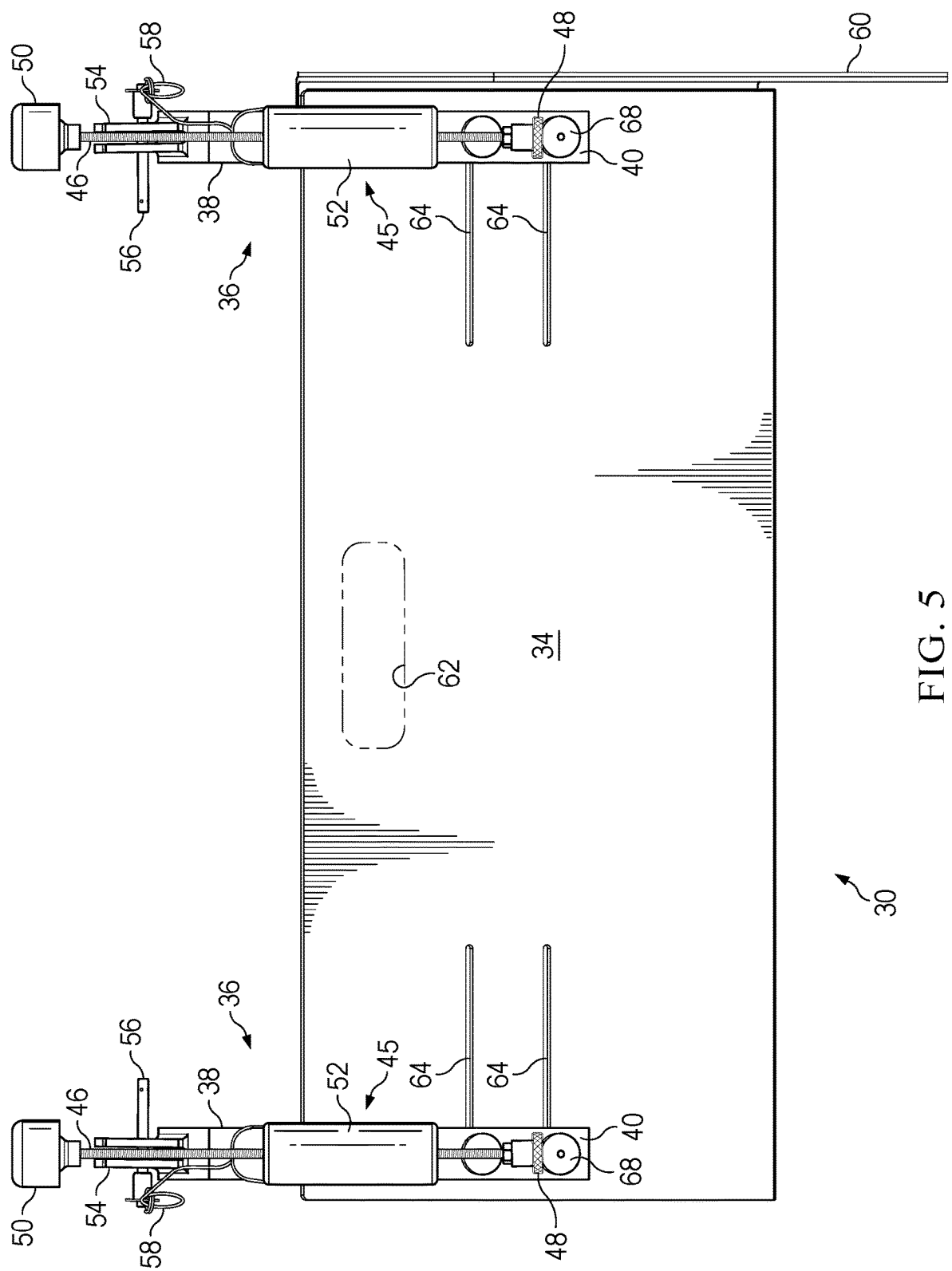
FIG. 5 is a bottom plan view of the example tray.
Figure 6:
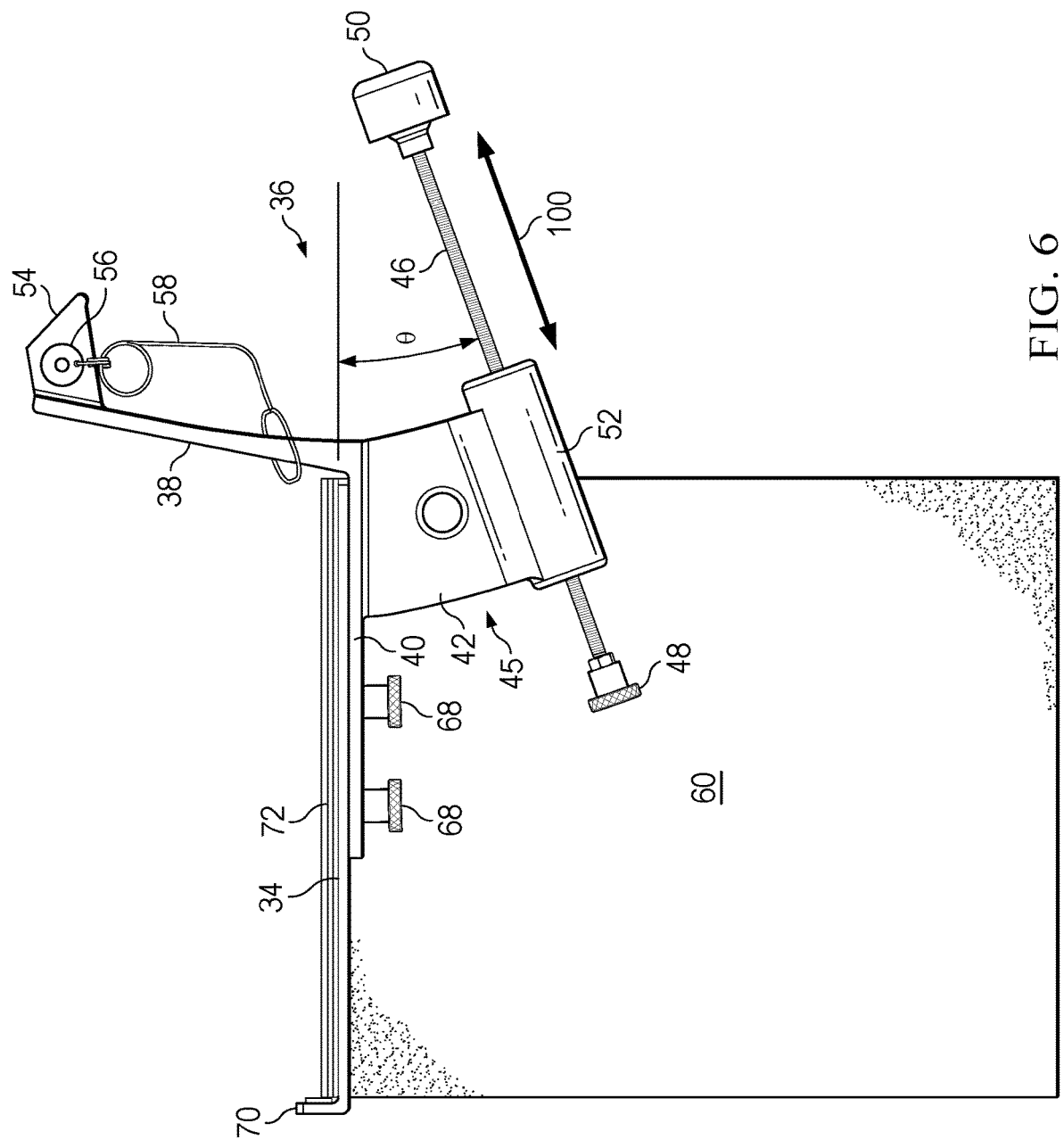
FIG. 6 is a side view of the example tray.
Figure 7:
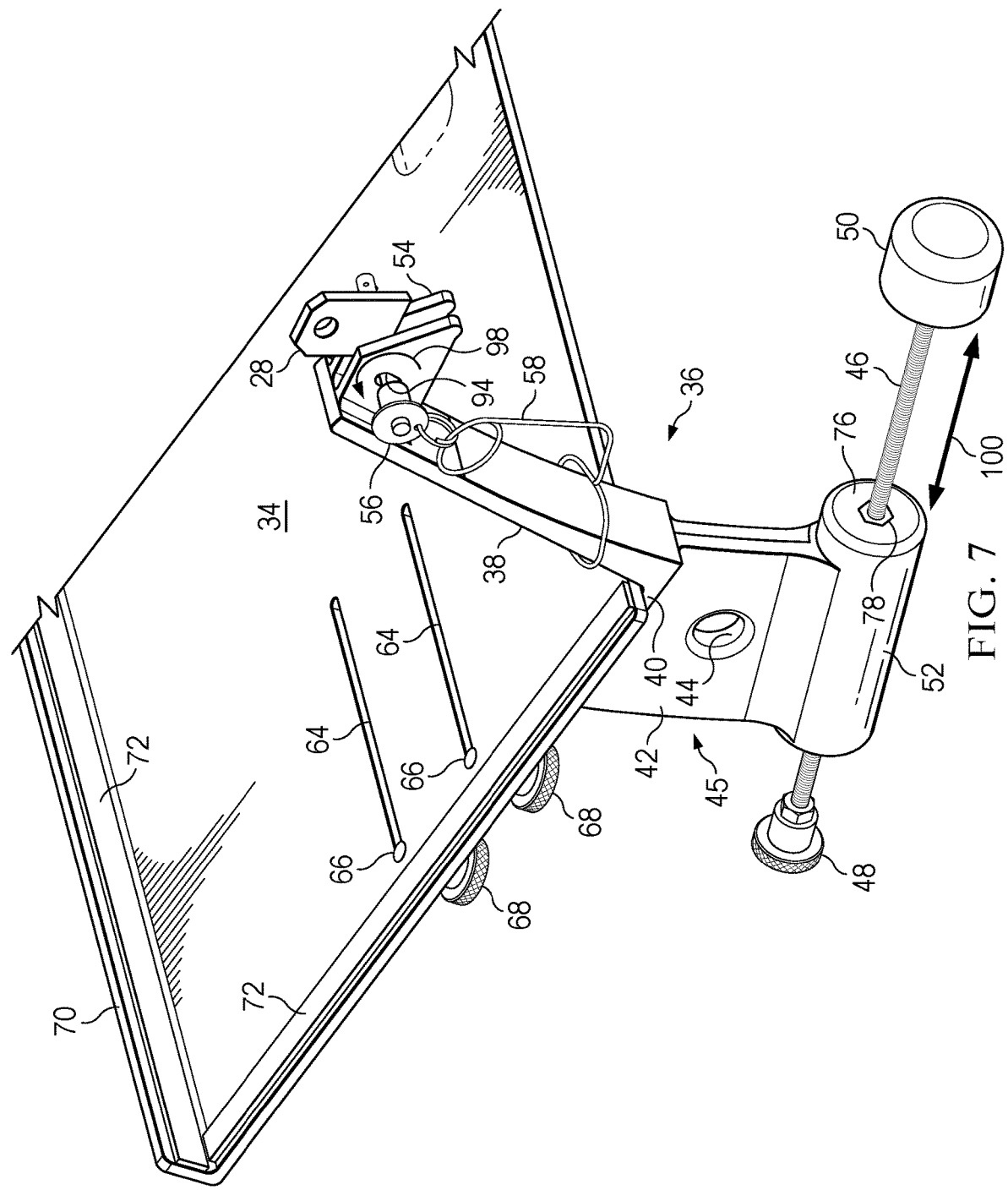
FIG. 7 is a perspective view of one end of the example tray, the position of a bay door latch being shown in broken lines.
Figure 8:
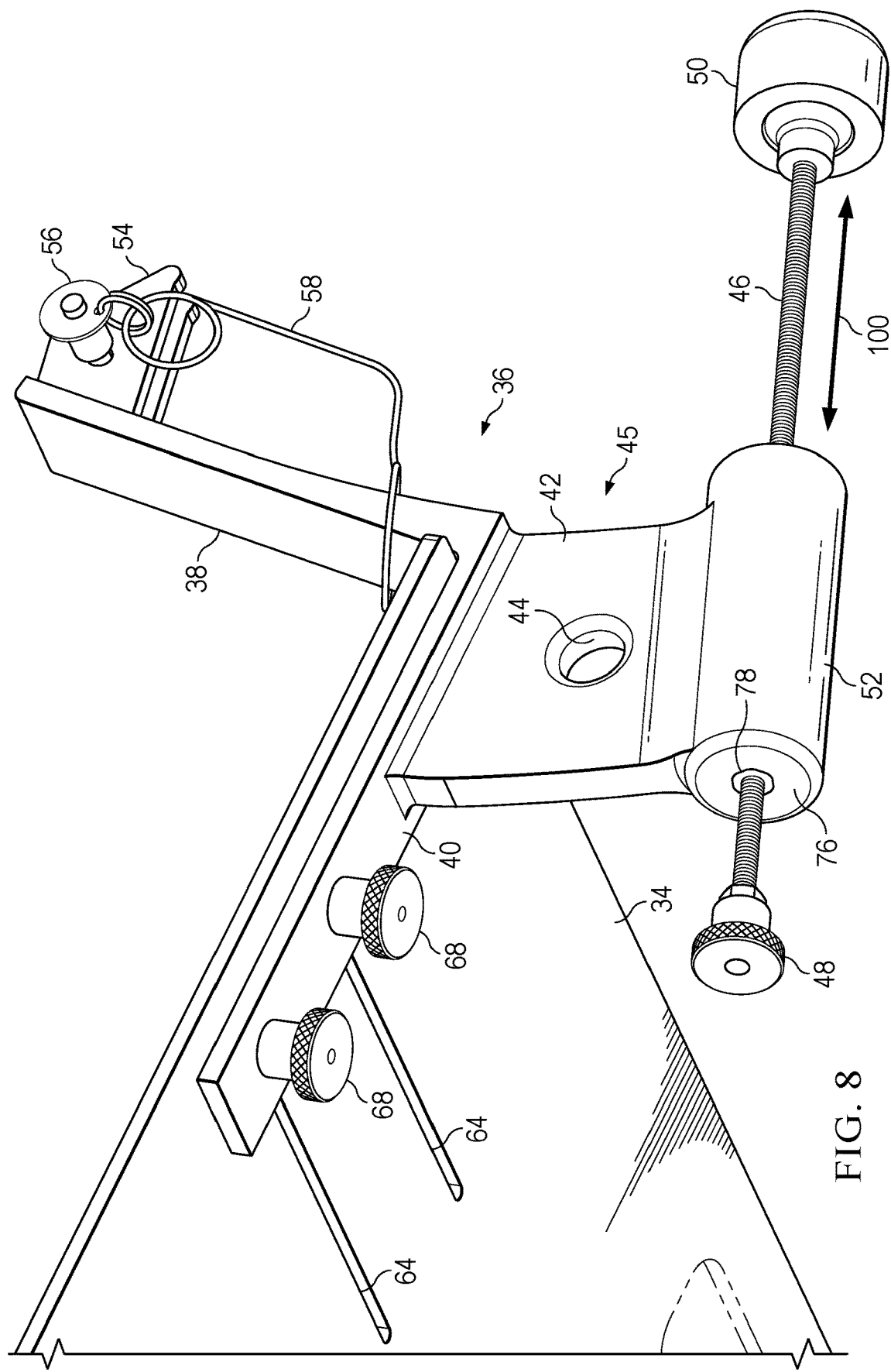
FIG. 8 is a bottom perspective view of one end of the example tray.
Figure 9:
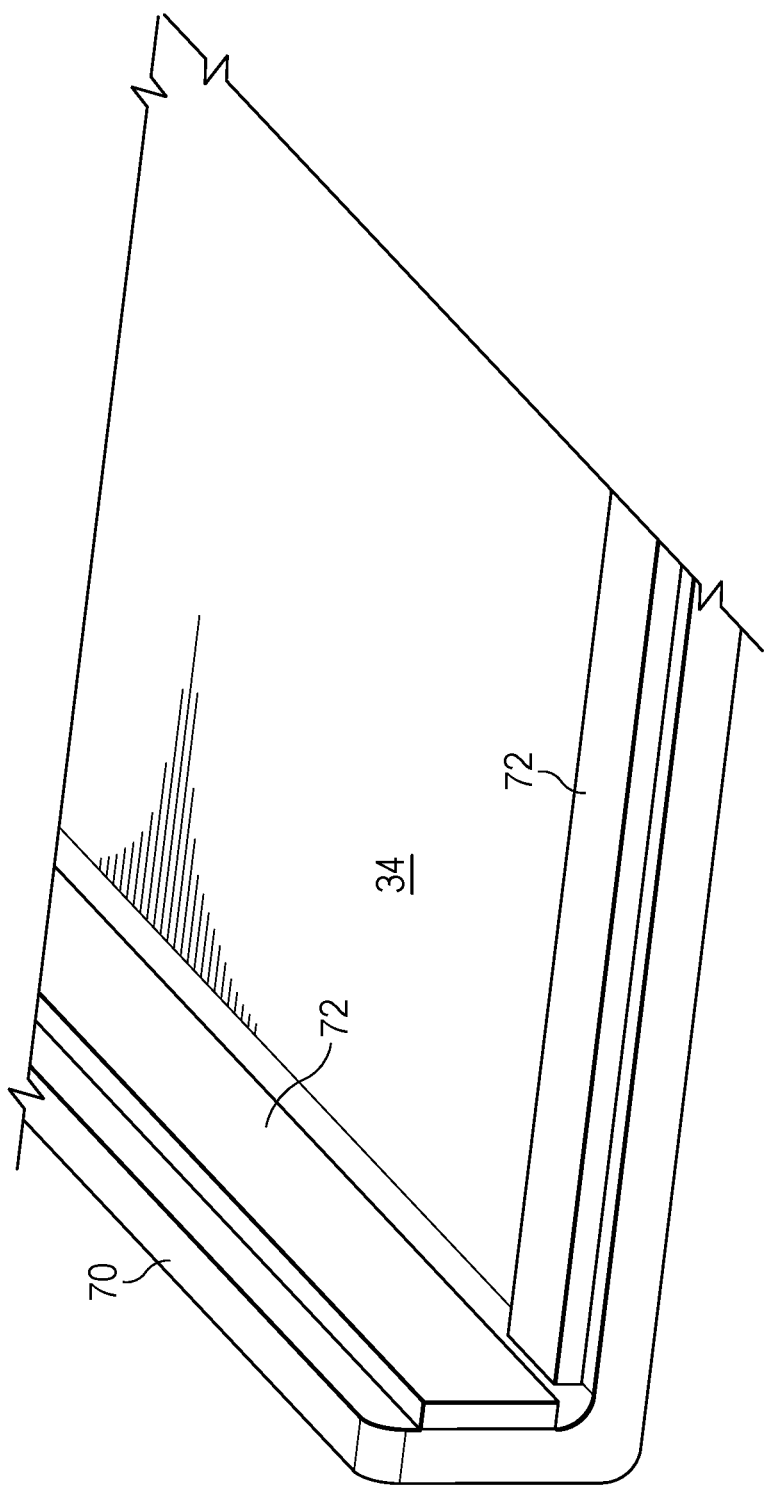
FIG. 9 is a perspective view of an outer corner of the example tray, illustrating the position of magnetic strips.
Figure 10:
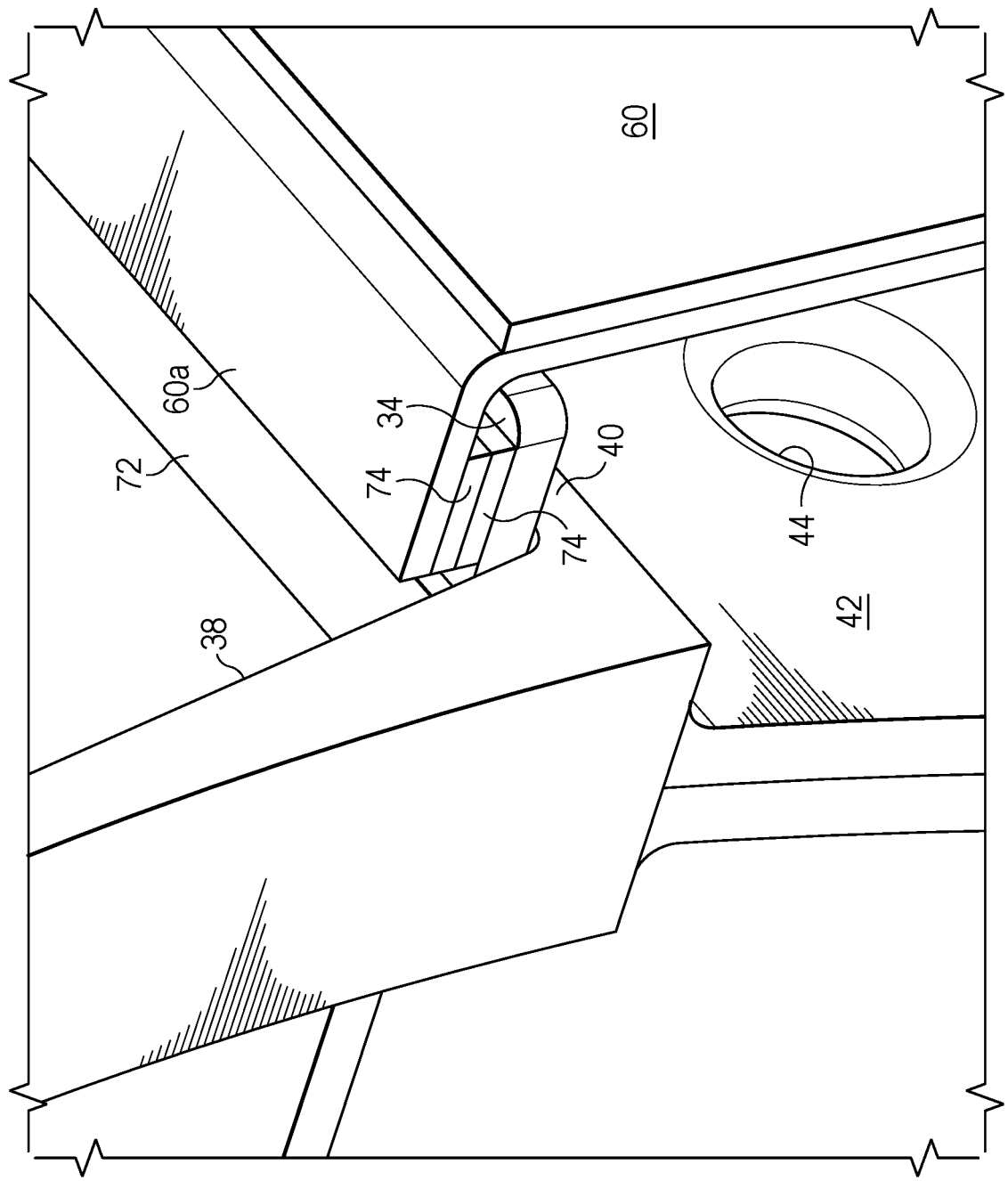
FIG. 10 is a perspective view illustrating the attachment of a bag to the example tray.

Optionally, a container such as a bag 60 may be attached to an outer edge of the shelf 34. The bag 60 may be formed of any suitable material such as canvas and functions as a storage area for specialized tools, parts, expendables, etc. As best seen in FIGS. 3 and 10, the bag 60 includes an upper lip 60a that is fastened to the shelf 34 by a set of releasable fastener strips 74, such as Velcro® brand hook and loop fabric fastener strips, thereby allowing the bag 60 to be easily removed or replaced when desired. In other examples, the container may be an open top basket-like structure (not shown).

In the illustrated example, two of the laterally spaced apart hanger assemblies 36 are provided, however in other examples, depending on the length of the shelf 34, more than two hanger assemblies 36 may be desirable. Each of the hanger assemblies 36 broadly comprises an upper arm 38, a lower arm 40, and a standoff 45 (FIG. 3) on the bottom of a bracket 42 that is attached to the lower arm 40. The upper arm 38 extends upwardly above the shelf 34 and includes, at its upper end, a pair of spaced apart ears 54, each having an aperture therein. A quick release, locking pin 56 (e.g., detent pin, ball lock, plunger pins, cotter pins, and the like) passes through the aperture in the ears 54 and pivotally mounts the hanger assembly 36 on the bay door latch 28. As will be discussed later, pivotal mounting of the tray 30 on the latches 28 facilitates leveling the shelf 34 during tray installation. In other examples, the upper arms 38 may include a variety of fixtures or mechanisms that adapt them to be releasably connected to the particular latch configuration used to latch the bay door. The quick release, locking pins 56 may be connected by lanyards 58 to the upper arms 38 in order to keep them readily accessible. In the illustrated example, the upper arms 38 are inclined at a preselected angle (not shown) relative to the plane of the shelf 34, which will depend upon the particular application.

The lower arms 40 are located beneath and are attached to the bottom surface of the shelf 34 by screws 66 that pass through slots 64 in the shelf 34. In this example, there are two sets of slots 64, however in other examples, there may be as few as one or greater than two of the slots 64. Threaded knobs 68 on the end of the screws 66 tighten the lower arms 40 against the shelf 34, thereby locking the hanger assemblies 36 in fixed positions along the slots 64. Loosening of the threaded knobs 68 releases the hanger assemblies 36, permitting them to slide toward or away from each other within the slots 64, thereby allowing adjustment of the lateral spacing between the hanger assemblies 36.

Each of the standoffs 45 comprises a threaded standoff rod 46 passing through a standoff support 52 that is suspended beneath the shelf 34 by a bracket 42. The bracket 42 may include one or more lightening holes 44 for weight reduction, and may be attached to the bottom of the lower arms 40 by fasteners (not shown), welding or other means of attachment. In some examples, the bracket 42 may be integrally formed with the lower arm 40 by 3D printing, or other additive manufacturing techniques. The standoff support 52 is cylindrical in shape and may be integrally formed with or attached to the bottom of the bracket 42. In the illustrated example, the standoff support 52 is hollow and includes end caps 76 provided with co-aligned insert nuts 78 in its opposite ends. The standoff rod 46 is threaded along its length and functions as a screw passing through the insert nuts 78. The bracket 42 is configured to hold the standoff rod 46 at a desired angle θ (FIG. 6) relative to the plane of the shelf 34 in order to best orient the standoff rod 46 for a particular application.

Figure 11:
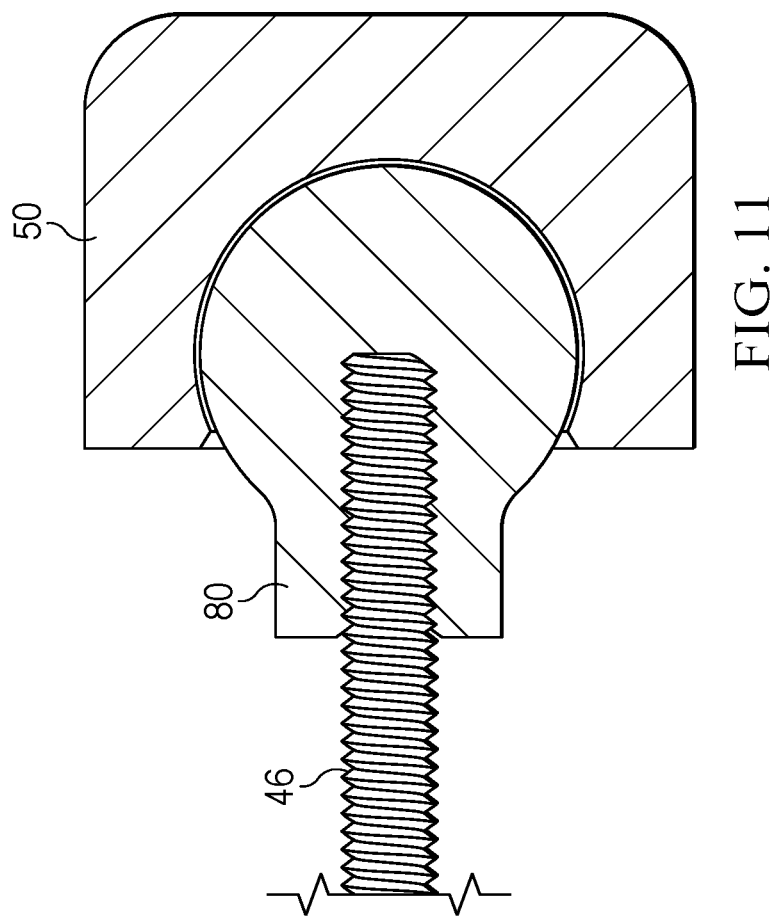
FIG. 11 is a cross-sectional view illustrating attachment of a pad to the end of a standoff rod.
Figure 12:
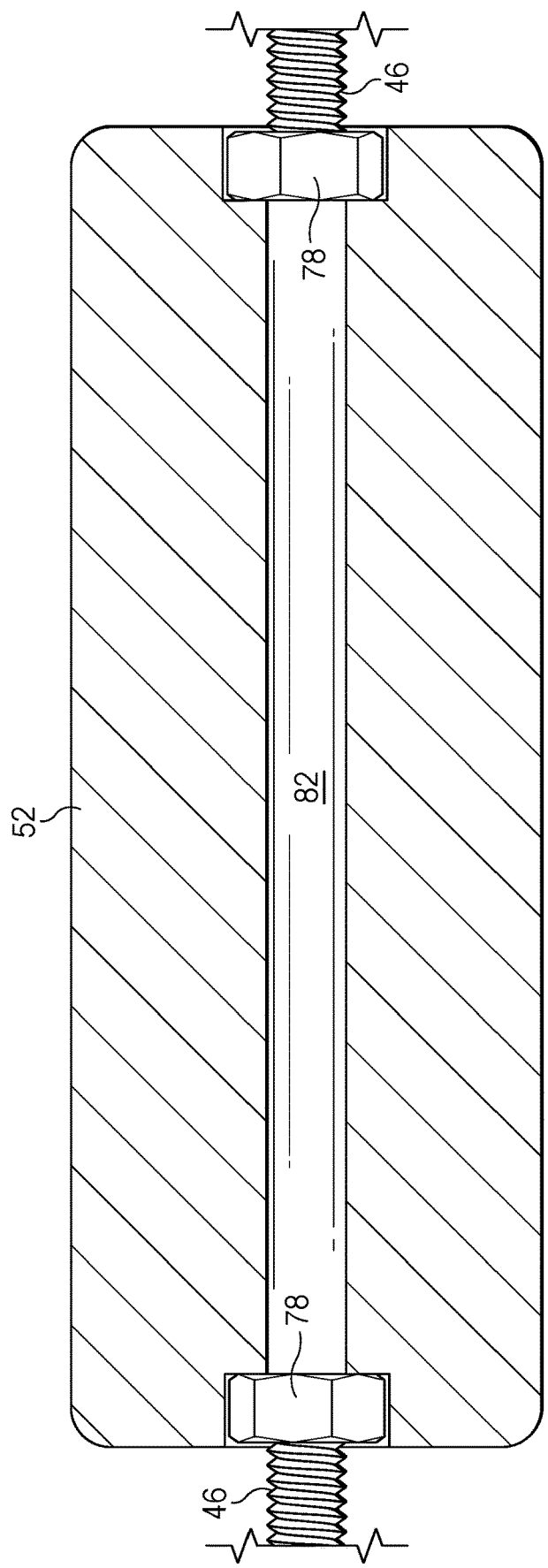
FIG. 12 is a cross-sectional view of a standoff rod support.
Figure 13:
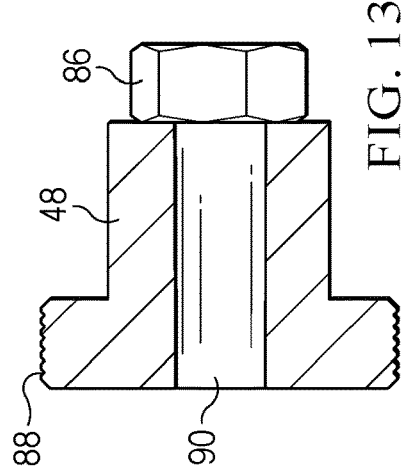
FIG. 13 is a cross-sectional view of a knob used to adjust the position of the standoff rod.

In another example, shown in FIG. 12, the standoff support 52 may be a solid body formed of any suitable material and has a longitudinal passageway 82 therethrough for receiving the standoff rod 46. In one example, the bracket 42 and the standoff support 52 are integrally formed of a rigid material as by casting or 3D printing. The outer end of the standoff rod 46 is provided with a pad 50 configured to engage the fuselage 22 or other structure on which the tray 30 is mounted. In one example, shown in FIG. 11, the pad 50 is mounted on the end of the standoff rod 46 by a socket 80 which may be pressed or insert molded into the pad 50. The pad 50 may be formed of any suitable flexible or soft material such as elastomer that will not damage the outer skin 32 of the fuselage 22. The second end of the standoff rod 46 is provided with a round knob 48 having a knurled outer surface 88. The knob 48 includes an insert nut 86 aligned with a central bore 90 that receives a threaded end of the standoff rod 46. Turning of the knob 48 displaces the standoff rod 46, thereby adjusting the position of the pad 50 relative to the side 96 of the aircraft 20. Because the standoff rod 46 is displaceable along its length, the standoffs 45 adapt the tray 30 for mounting on a wide range structures with various geometries.

Figure 15:
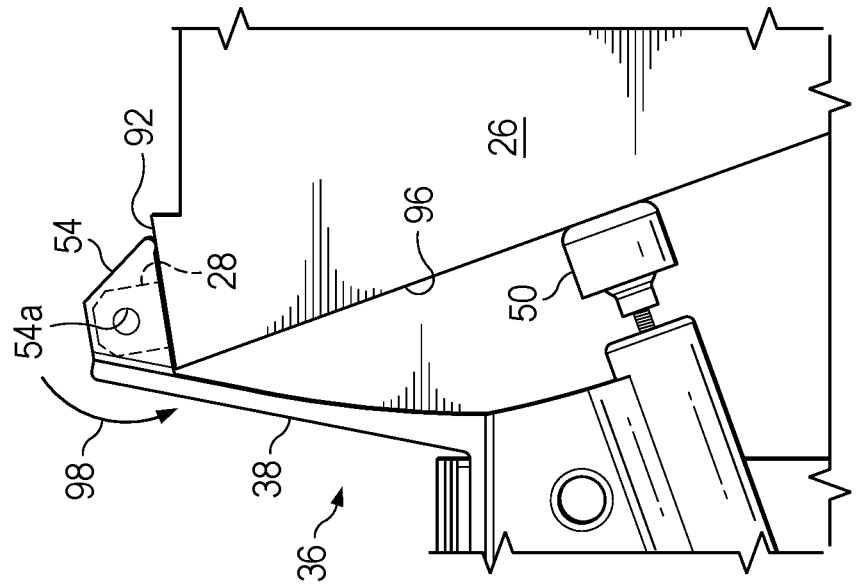
FIG. 15 is a view similar to FIG. 14, but showing the example tray having been mounted on the side of the vehicle along the open bay.

Attention is now directed to FIGS. 14 and 15 which illustrates how the tray 30 may be positioned in preparation for mounting it on the side 96 of a structure, such as beneath an open bay 26 in the fuselage 22 of an aircraft 20. As seen in FIG. 14, the open bay 26 typically has a bay door locking mechanism that includes structures such as a latch 28 along an edge 92 that is configured to be engaged by a mechanism on a bay door. The latch 28 includes an aperture 94. The tray 30 is initially positioned along the side 96 of the aircraft 20, with the ears 54 aligned with the latch 28 such that the latch 28 is inserted between the ears 54, with the through holes 54a in the ears 54 aligned with the apertures 94 in the latches 28. Next, the locking pins 56 are inserted through the ears 54 in the latches 28, thereby locking the upper arms 38 on the edge 92. Depending upon the configuration of the ears 54, the locking pins 56 allow the tray 30 to pivot 98, permitting the shelf 34 to be pivoted to a level position by the installer. Next, the installer adjusts the length of the standoff rods 46 so that the pads 50 engage the side 96 of the fuselage 22 to limit pivoting of the shelf 34, causing the shelf 34 to be held in a level position.

With the tray 30 installed as described above, FOD can be placed on the shelf 34 within ready reach of a service technician, eliminating the need for placing items inside the open bay 26 where they become FOD that may be lost or forgotten. The outer, up-standing lip 70 on the shelf 34 prevents larger items from falling off the front edge of the shelf 34, while the magnetic strips 72 prevent smaller metallic items from sliding or rolling off the shelf 34. The lateral adjustability on the hanger assemblies 36, combined with the adjustable length of the standoff rods 46 allows the tray 30 to be mounted on any of a wide range of structures having various geometries and features. The tray 30 may be easily removed from the aircraft 20 simply by removing the locking pins 56 and lifting the tray 30 away from side 96 of the aircraft 20.

Figure 16:
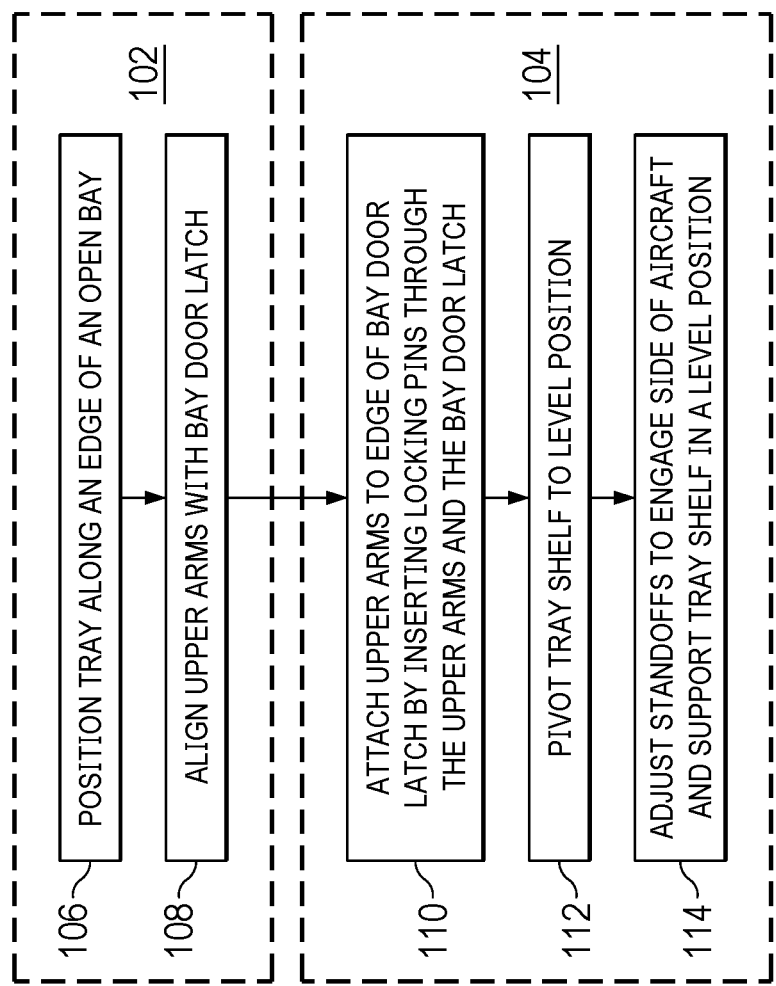
FIG. 16 is a flow diagram of a method of installing an example tray along an open bay in the side of a vehicle.

Attention is now directed to FIG. 16 which illustrates the overall steps of a method of installing a tray 30 along an open bay 26 in the side 96 of an aircraft 20. At 102 the tray 30 is positioned along the open bay 26, and at 104 the tray 30 is mounted along an edge 92 of the open bay 26. The positioning step performed at 102 includes positioning the tray 30 along an edge 92 of the open bay, and aligning the upper arms 38 with a bay door latch 28 which may comprise inserting the latch 28 between a pair of ears 54 on the upper arms 38. At 110, the upper arms 38 are attached to the bay latch 28 by inserting locking pins 56 between the upper arms 38 and the bay door latch 28. Then, at 112, the tray 30, and more particularly the shelf 34 are pivoted to a level position following which at 114, standoff rods 46 are adjusted in length so that they engage the side 96 of the aircraft 20 and support the tray 30 in a level position.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

One or more features of the illustrative examples are described in the following clauses. These causes are examples of features not intended to limit other illustrative examples.

Clause 1. A tray configured to be removably mounted on a side of a structure, comprising:
a shelf; and
a pair of hanger assemblies spaced apart from each other and configured to hang the shelf on the structure,
each of the hanger assemblies including an upper arm removably attached to the structure, and a lower arm configured to support the shelf.

Clause 2. A tray as in clause 1, wherein each of the upper arms is configured to pivotally mount the hanger assembly on the structure.

Clause 3. A tray as in one of clauses 1 or 2, wherein each of the hanger assemblies further includes a standoff located beneath the shelf and configured to limit pivoting of the tray.

Clause 4. A tray as in clause 3, wherein the standoff includes:
a rod, and
a pad on one end of the rod configured to engage the structure.

Clause 5. A tray as in clause 4, wherein:
each of the hanger assemblies includes a bracket below the shelf, and
the rod is a screw mounted on the bracket and adjustable to each of a plurality of positions.

Clause 6. A tray as in any of clauses 1, 2, 4, and/or 5, wherein each of the hanger assemblies includes a pin releasably connecting one of the upper arms with the structure.

Clause 7. A tray as in clause 6, wherein each of the hanger assembly includes:
a pair of ears configured to receive a portion of the structure therein, and
wherein the pin passes through the structure and the ears.

Clause 8. A tray as in any of clauses 1, 2, 4, 5, and/or 7, wherein:
the shelf includes slots therein, and
the hanger assemblies are mounted on the shelf for sliding movement along the slots toward and away from each other.

Clause 9. A tray as in any of clauses 1, 2, 4, 5, and/or 7, wherein the shelf includes:
at least one up-standing lip along an outer edge of the shelf, and
a magnetic strip attached to the lip.

Clause 10. A tray as in any of clauses 1, 2, 4, 5, and/or 7, further comprising:
a bag removably attached to the shelf along an outer edge of the shelf.

Clause 11. A tray configured to be mounted along an open bay in a side of an aircraft, comprising:
a shelf; and
a pair of hanger assemblies configured to hang the shelf on the side of the aircraft beneath the open bay, each of the hanger assemblies including an upper arm configured to be attached to the aircraft along an edge of the open bay.

Clause 12. A tray as in clause 11, further comprising:
a lower arm connected to the upper arm and configured to support the shelf.

Clause 13. A tray as in clause 11 or 12, further comprising:
a standoff connected with and located beneath the shelf, the standoff being configured to engage the side of the aircraft.

Clause 14. A tray as in clause 13, wherein the standoff includes a rod displaceable along its length to any of a plurality of adjustment positions.

Clause 15. A tray as in clause 14, wherein:
the rod is a screw, and
the standoff further includes a pad on an end of the rod configured to engage the side of the aircraft.

Clause 16. A tray as in any of clauses 11-15, wherein:
the shelf includes slots therein, and
the hanger assemblies are mounted in the slots for sliding movement toward and away from each other allowing adjustment of a spacing between the hanger assemblies.

Clause 17. A method of installing a tray along an open bay in a side of an aircraft, comprising:
positioning a tray along the open bay; and
mounting the tray along an edge of the open bay.

Clause 18. A method as in clause 17, wherein mounting the tray includes attaching the tray to a portion of a latch on the open bay.

Clause 19. A method as in clause 18, wherein attaching the tray includes releasably connecting the tray to the latch, thereby allowing the tray to be removed from the side of the aircraft.

Clause 20. A method as in any of clauses 17-19, wherein mounting the tray along the edge includes installing standoffs between the tray and the side of the aircraft.

What is claimed is:

1. An apparatus, comprising:
a tray comprising
a shelf; and
a pair of hanger assemblies spaced apart from each other and configured to hang the shelf on a structure, wherein each of the hanger assemblies including an upper arm configured to be removably attached to the structure, and a lower arm that supports the shelf,
wherein each of the upper arms is configured to pivotally mount the hanger assembly on the structure,
wherein each of the hanger assemblies further includes a standoff located beneath the shelf and configured to limit pivoting of the tray, and
wherein each of the hanger assemblies includes a pin connecting one of the upper arms with the structure.

2. The apparatus of claim 1, wherein the standoff includes:
a rod, and
a pad on one end of the rod configured to engage the structure.

3. The apparatus of claim 2, wherein:
each of the hanger assemblies includes a bracket below the shelf, and
the rod is a screw mounted on the bracket and adjustable to each of a plurality of positions.

4. The apparatus of claim 1, wherein:
the shelf includes slots therein, and
the hanger assemblies are mounted on the shelf for sliding movement along the slots toward and away from each other.

5. The apparatus of claim 1, wherein the shelf includes:
at least one up-standing lip along an outer edge of the shelf, and
a magnetic strip attached to the lip.

6. The apparatus of claim 1, further comprising:
a bag removably attached to the shelf along an outer edge of the shelf.

7. An apparatus, comprising
a tray comprising:
a shelf; and
a pair of hanger assemblies spaced apart from each other and configured to hang the shelf on a structure, each of the hanger assemblies including an upper arm removably attached to the structure, and a lower arm configured to support the shelf,
wherein each of the upper arms is configured to pivotally mount the hanger assembly on the structure,
wherein each of the hanger assemblies includes a pin configured to connect one of the upper arms with the structure,
wherein each of the hanger assemblies includes a pair of ears configured to receive a portion of the structure therein, and
wherein the pin is configured to releasably slide within, and pass through the structure.

8. The apparatus of claim 7, wherein each of the hanger assemblies further includes a standoff located beneath the shelf and configured to limit pivoting of the tray.

9. The apparatus of claim 8, wherein the standoff includes:
a rod, and
a pad on one end of the rod configured to engage the structure.

10. The apparatus of claim 9, wherein:
each of the hanger assemblies includes a bracket below the shelf, and
the rod is a screw mounted on the bracket and adjustable to each of a plurality of positions.

11. The apparatus of claim 7, wherein:
the shelf includes slots therein, and
the hanger assemblies are mounted on the shelf for sliding movement along the slots toward and away from each other.

12. The apparatus of claim 7, wherein the shelf includes:
at least one up-standing lip along an outer edge of the shelf, and
a magnetic strip attached to the lip.

13. The apparatus of claim 7, further comprising:
a bag removably attached to the shelf along an outer edge of the shelf.

14. An apparatus, comprising:
a tray comprising
a shelf; and
a pair of hanger assemblies configured to hang the shelf on a side of an aircraft beneath an open bay, each of the hanger assemblies including an upper arm configured to be attached to the aircraft along an edge of the open bay,
wherein each of the upper arms is configured to pivotally mount the hanger assembly on the edge of the open bay,
wherein each of the hanger assemblies further includes a standoff located beneath the shelf and configured to limit pivoting of the tray, and
wherein each of the hanger assemblies includes a pin connecting one of the upper arms with the edge of the open bay.

15. The apparatus of claim 14, further comprising:
a lower arm connected to the upper arm and configured to support the shelf.

16. The apparatus of claim 14, further comprising:
a standoff connected with and located beneath the shelf, the standoff being configured to engage a side of an aircraft.

17. The apparatus of claim 16, wherein the standoff includes a rod displaceable along its length to any of a plurality of adjustment positions.

18. The apparatus of claim 17, wherein:
the rod is a screw, and
the standoff further includes a pad on an end of the rod configured to engage a side of an aircraft.

19. The apparatus of claim 14, wherein:
the shelf includes slots therein, and
the hanger assemblies are mounted in the slots for sliding movement toward and away from each other allowing adjustment of a spacing between the hanger assemblies.

20. A method of installing a tray along an open bay in a side of an aircraft, comprising:
positioning a tray having a shelf along an edge of a structure comprising the open bay, wherein the tray includes a pair of hanger assemblies spaced apart from each other and configured to hang the shelf on the structure, wherein each of the hanger assemblies including an upper arm configured to be removably attached to the structure, and a lower arm that supports the shelf; and
mounting the tray along an edge of the open bay, wherein each of the upper arms is configured to pivotally mount the hanger assembly on the structure and each of the hanger assemblies further includes a standoff located beneath the shelf and configured to limit pivoting of the tray, and
utilizing a pin for releasably connecting one of the upper arms with the structure.

21. A method as in claim 20, wherein mounting the tray includes attaching the tray to a portion of a latch on the open bay.

22. A method as in claim 21, wherein attaching the tray includes releasably connecting the tray to the portion of the latch, thereby allowing the tray to be removed from the side of the aircraft.

23. A method as in claim 21, wherein mounting the tray along the edge includes installing the standoff between the tray and the side of the aircraft.

* * * * *